United States Patent
Byoun et al.

(10) Patent No.: US 11,823,710 B2
(45) Date of Patent: Nov. 21, 2023

(54) DUAL SPINDLE MOTORS AND DUAL SPINDLE MOTOR CONTROL FOR DATA STORAGE

(71) Applicant: Western Digital Technologies, Inc., San Jose, CA (US)

(72) Inventors: Jaesoo Byoun, Irvine, CA (US); Brian Johnson, Laguna Hills, CA (US); Gaku Ikedo, Fujisawa (JP); Hideaki Ito, Fujisawa (JP); Naoyuki Kagami, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/679,219

(22) Filed: Feb. 24, 2022

(65) Prior Publication Data
US 2023/0267960 A1    Aug. 24, 2023

(51) Int. Cl.
 G11B 19/28    (2006.01)
 G11B 19/20    (2006.01)
 G11B 25/04    (2006.01)
 H02K 16/00    (2006.01)

(52) U.S. Cl.
 CPC ............ *G11B 19/28* (2013.01); *G11B 25/043* (2013.01); *H02K 16/00* (2013.01); *G11B 19/2081* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 6,124,689 A | 9/2000 | Kardash | |
| 8,610,391 B1 * | 12/2013 | Yang et al. | H02P 6/08 360/73.03 |
| 9,997,182 B1 | 6/2018 | Tanner et al. | |
| 9,998,042 B2 | 6/2018 | Chadsey et al. | |
| 10,152,994 B1 | 12/2018 | Capretta et al. | |
| 11,062,734 B1 | 7/2021 | Brand | |
| 2004/0124799 A1 * | 7/2004 | Tanner | G11B 19/20 318/471 |
| 2006/0007581 A1 | 1/2006 | Brenden et al. | |
| 2008/0037164 A1 | 2/2008 | Oh et al. | |
| 2013/0148240 A1 * | 6/2013 | Ferris et al. | G11B 19/20 360/99.08 |
| 2015/0084552 A1 * | 3/2015 | Feldman et al. | G11B 19/2054 318/63 |

FOREIGN PATENT DOCUMENTS

CN    211830491 U    10/2020

* cited by examiner

*Primary Examiner* — Craig A. Renner
(74) *Attorney, Agent, or Firm* — Neugeboren O'Dowd PC (57) ABSTRACT

Various illustrative aspects are directed to a data storage device comprising a first spindle motor configured to rotate one or more disks in a first stack of disks, a second spindle motor configured to rotate one or more disks in a second stack of disks, and one or more processing devices configured to detect back electromotive force (BEMF) voltages generated by the first spindle motor and the second spindle motor. In other aspects the one or more processing devices can control speeds of the first spindle motor and the second spindle motor based on the detected BEMF voltages.

16 Claims, 9 Drawing Sheets

DUAL SPINDLE MOTORS AND DUAL SPINDLE MOTOR CONTROL FOR DATA STORAGE

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

Figure 1:
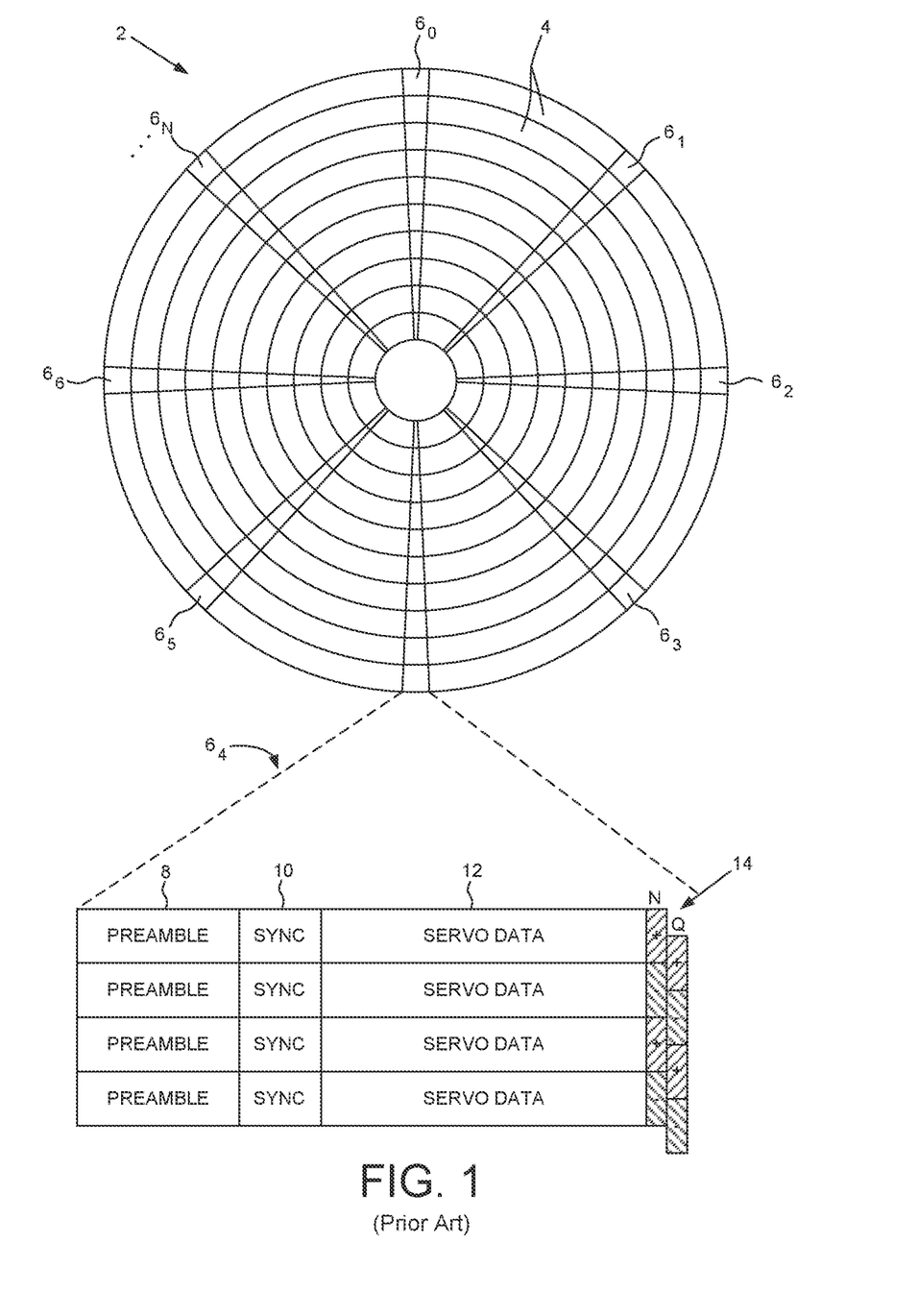
FIG. 1 shows a prior art disk format comprising a number of radially spaced concentric servo tracks defined by servo wedges recorded around the circumference of each servo track.

FIG. 1 shows a prior art disk format 2 comprising a number of radially spaced concentric servo tracks 4 defined by servo wedges $6_0$-$6_N$ recorded around the circumference of each servo track. A plurality of concentric data tracks is defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators to actuate the head radially over the disk in a direction that reduces the PES.

SUMMARY

Various aspects disclosed herein provide dual spindle motors and dual spindle motor control for data storage devices, systems, and methods, among other aspects.

Increasing areal density (a measure of the quantity of information bits that can be stored on a given area of a disk surface) is one of the ongoing goals of hard disk drive ("disk drive", "HDD") technology evolution. In one form, this goal manifests in high-capacity disk drives, which may be particularly useful in the context of enterprise, cloud computing/storage, and data center environments.

In view of this need to increase high-capacity disk drive performance, a disk drive comprising dual spindle motors and dual spindle motor control is disclosed herein. Disk drives of this disclosure may comprise an independently controlled second spindle motor, in various aspects. The disks may be divided into two or more separate stacks or packs of disks, such that a first spindle motor controls a first stack of disks, and a second spindle motor controls a second stack of disks, in some aspects. The first and second stacks of disks, or the more than two stacks of disks, may be arranged concentrically or coaxially with each other, side-by-side and parallel with each other, or in other physical arrangements, in accordance with different aspects. Disk drives of this disclosure may implement finer control over the usage and power consumption of each stack of disks, in various aspects.

Because part of the disk drive (e.g., a first spindle motor and a first stack of disks that it controls) may not be used at times, even while another part of the disk drive (e.g., a second spindle motor and a second stack of disks that it controls) is being used for a period of time, one of the spindle motors can be operated in a low-power mode or turned off to reduce power consumption, for that period of time. With a dual spindle motor design, the disk drive can spin up only the spindle motor that controls the particular disk stack that data will be written to or read from. When both spindle motors are needed, the disk drive may stagger the spin ups of the separate disk stacks to reduce spin up peaks, in various aspects. Moreover, once enough data is accumulated, a disk drive of this disclosure may store older data in one portion of the disk drive and may reduce the power applied to the spindle motor controlling the disks in that portion of the drive to a lower idle power, while the disk drive may continue operating the spindle motor controlling the portion of the drive where data that is more frequently accessed is stored at higher power.

Various aspects of the present disclosure provide dual spindle motor control circuitry for controlling a dual spindle motor configuration. In single spindle motor design, a dedicated PLSI (power large scale integrated circuit) may be provided to drive the single spindle motor. Thus, one option for dual spindle motor control, according to aspects of this disclosure, is that each of the dual spindle motors may be driven with a separate, dedicated PLSI. Another option for dual spindle motor control, according to aspects of this disclosure, is that the dual spindle motors are driven with a single PLSI that is configured to drive both of the spindle motors. Reductions in die saving area and printed circuit board assembly (PCBA) area can thereby be achieved by dispensing with the need for two PLSIs and for doubles of various components of the motor control circuitry to drive the two spindle motors. Aspects of this disclosure also provide power improvements in driving the dual spindle motors, such as peak power reduction.

Various illustrative aspects are directed to a data storage device comprising a first spindle motor configured to rotate one or more disks in a first stack of disks, a second spindle motor configured to rotate one or more disks in a second stack of disks, and one or more processing devices configured to detect back electromotive force (BEMF) voltages generated by the first spindle motor and the second spindle motor. In other aspects the one or more processing devices can control speeds of the first spindle motor and the second spindle motor based on the detected BEMF voltages.

In another aspect a method comprises rotating, by a first spindle motor, one or more disks in a first stack of disks, rotating, by a second spindle motor, one or more disks in a second stack of disks, detecting, by one or more processing devices, back electromotive force (BEMF) voltages generated by the first spindle motor and by the second spindle motor, and controlling, by the one or more processing devices, speeds of the first spindle motor and the second spindle motor based on the detected BEMF voltages.

In a further aspect a data storage device comprises first means for rotating one or more disks in a first stack of disks, second means for rotating one or more disks in a second stack of disks, means for detecting back electromotive force (BEMF) voltages generated by the first means for rotating and the second means for rotating, and means for controlling rotation speeds of the first means for rotating and the second means for rotating based on the detected BEMF voltages.

Various further aspects are depicted in the accompanying figures and described below, and will be further apparent based thereon.

BRIEF DESCRIPTION OF THE DRAWINGS

Various features and advantages of the technology of this disclosure will be apparent from the following description of particular examples of those technologies, and as illustrated in the accompanying drawings. The drawings are not necessarily to scale; emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

Figure 2A:
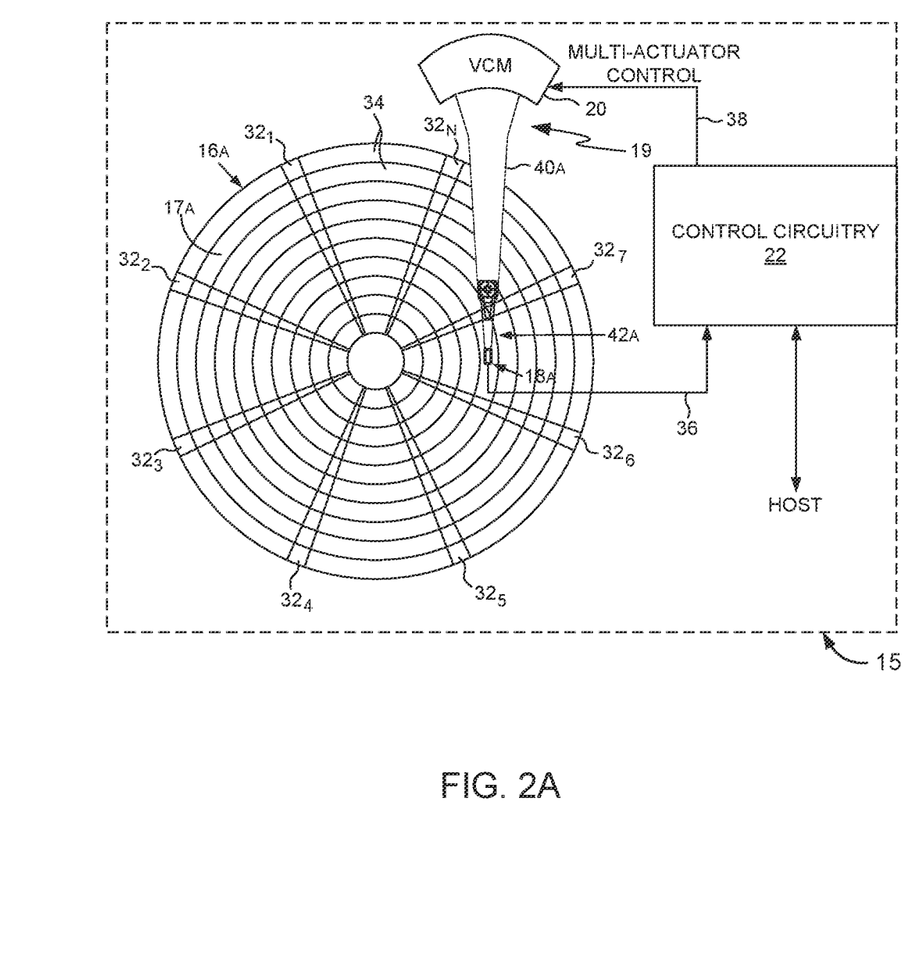
FIGS. 2A and 2B illustrate conceptual block diagrams of a top view and a side view of a data storage device in the form of a disk drive, in accordance with aspects of this disclosure.
Figure 2B:
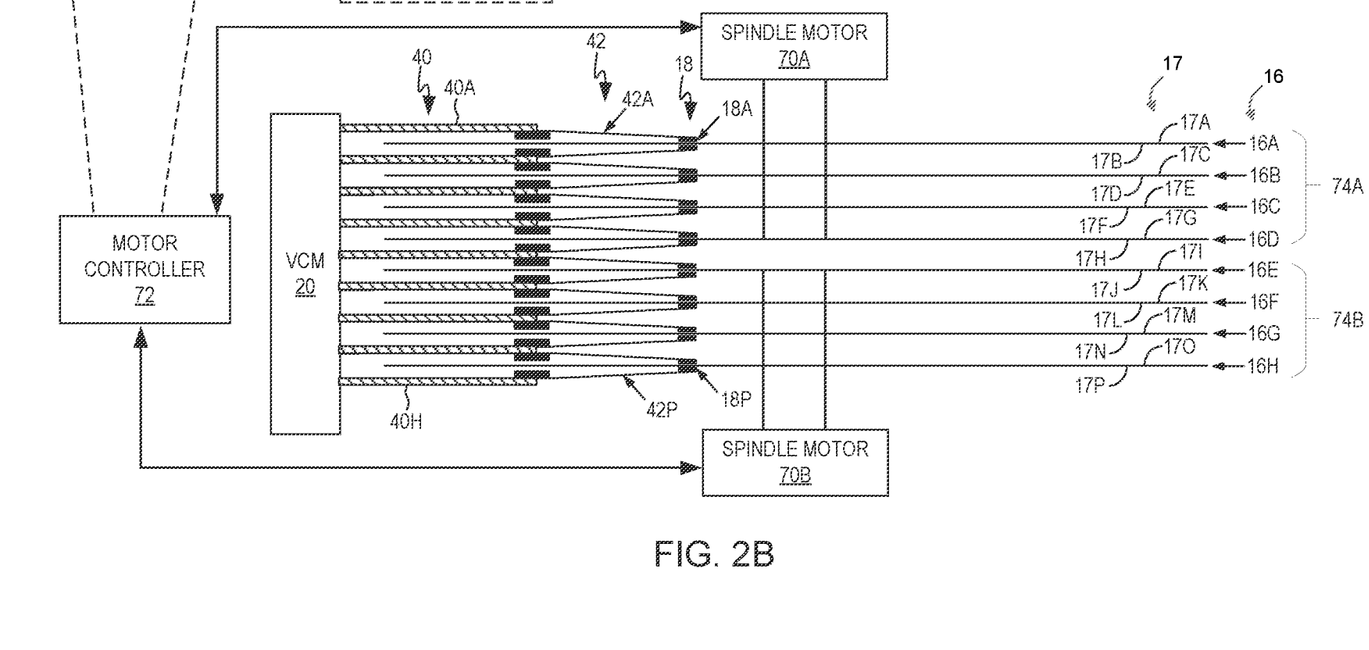

FIGS. 2A and 2B illustrate conceptual block diagrams of a top view and a side view of a data storage device in the form of a disk drive 15, in accordance with aspects of this disclosure. Disk drive 15 may comprise an actuator assembly 19 configured to write and read control features and data to and from disk surfaces 17 of one or more hard disks 16.

Figure 2C:
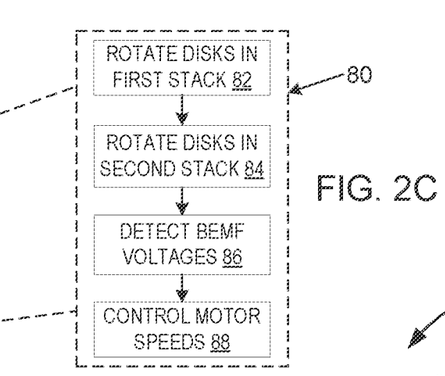
FIG. 2C illustrates a flowchart of a method that a data storage device may perform, execute, and implement, in accordance with aspects of this disclosure

Disks 16 may be divided into two or more separate and concentrically or coaxially arranged stacks or packs of disks such that, in accordance with control signals received from a motor controller 72, a first spindle motor 70A controls rotation of a first stack 74A of disks, and a second spindle motor 70B controls rotation of a second stack 74B of disks. FIG. 2C depicts a flowchart for an example method 80 that motor controller 72 of disk drive 15 may perform or execute in controlling the operations of first spindle motor 70A and second spindle motor 70B, in accordance with aspects of the present disclosure, as further described below.

Disk stacks 74A and 74B each comprise a plurality of disks 16. For exemplary purposes, FIG. 2B shows first stack 74A as comprising four disks 16A, 16B, 16C and 16D, and second stack 74B as comprising four disks 16E, 16F, 16G, 16H. It should be understood, however, that stacks 74A and 74B may comprise any number of disks; four disks 16 are shown in each stack 74A and 74B for non-limiting purposes of illustration only. In accordance with control signals received from motor controller 72, first spindle motor 70A controls rotation of disks 16A, 16B, 16C and 16D in first stack 74A, and second spindle motor 70B controls rotation of disks 16E, 16F, 16G and 16H in second stack 74B.

Each of disks 16 has a top surface and a bottom surface. Thus, top disk 16A has a top surface 17A and a bottom surface 17B, the next disk 16B has a top surface 17C and a bottom surface 17D, disk 16C has a top surface 17E and a bottom surface 17F, disk 16D has a top surface 17G and a bottom surface 17H, disk 16E has a top surface 17I and a bottom surface 17J, disk 16F has a top surface 17K and a bottom surface 17L, disk 16G has a top surface 17M and a bottom surface 17N, and disk 16H has a top surface 17O and a bottom surface 17P. The surfaces of disks 16, such as the top surface 17A of the top disk 16A shown in the top view of FIG. 2A, and as described with reference to FIG. 1, comprise radially spaced, concentric servo tracks 34 defined by servo wedges $32_1$-$32_N$ recorded around the circumference of each servo track.

Actuator assembly 19, which is configured to write and read control features and data to and from disk surfaces 17 of disks 16, comprises a primary actuator 20 and a plurality of actuator arms 40 (e.g., actuator arm 40A as shown in the top view of FIG. 2A; actuator arms 40A . . . 40H as shown in the side view of FIG. 2B). In one implementation, primary actuator 20 is a voice control motor ("VCM"). A read/write head 18 is configured at the distal end of each actuator arm 40 via a suspension (fine actuator) 42. As can be seen in FIG. 2A, for example, read/write head 18A is configured at the distal end of actuator arm 40A via suspension 42A. Actuator aims 40 and suspensions 42 are configured to suspend read/write heads 18 in close proximity over a corresponding disk surface 17 (e.g., read/write head 18A is suspended by topmost actuator aim 40A and suspension 42A over topmost corresponding disk surface 17A . . . read/write head 18P is suspended by bottommost actuator arm 40H and suspension 42P under bottommost corresponding disk surface 17P). Various examples may include any of a wide variety of other numbers of disks and disk surfaces, other numbers of actuator arm assemblies and primary actuators, and other numbers of fine actuators on each actuator arm, besides those illustrated in the non-limiting example of FIGS. 2A and 2B.

Actuator assembly 19 operates in accordance with control signals 38 received from control circuitry 22. The control signals 38 generated by control circuitry 22 may include coarse control signals that control primary actuator (VCM) 20 to rotate actuator arms 40 to position read/write heads 18 radially over surfaces 17 of the disks 16, as well as fine control signals to more precisely position read/write heads 18 relative to surfaces 17 of disks 16. Control circuitry 22 also processes read signals 36 emanating from read/write heads 18.

According to aspects of this disclosure, and as described above, disk drive 15 comprises a dual spindle motor configuration including first spindle motor 70A driving rotation of the disks 16A-16D of first disk stack 74A, and second spindle motor 70B driving rotation of the disks 16E-16H of second disk stack 74B. In accordance with an aspect of this disclosure, one motor controller 72 controls operation of both spindle motors 70A and 70B.

While VCM 20 is drawn as a single block, it can include two independent VCMs in some embodiments, one for each of disk stacks 74A and 74B. This allows the VCM for disk stack 74A and spindle motor 70A to be in a low power or offline mode when data access is performed within disk stack 74B, and vice versa. Each VCM-spindle motor pair may be independently controlled. In certain embodiments where each disk stack includes a large number of disks, this degree of flexibility can allow localized power optimizations (e.g. a more power-efficient motor and/or VCM) for each disk stack. In some embodiments, the first and second disk stacks 74A and 74B are co-axial or substantially co-axial as shown. Each disk stack may be coupled to a set of hub and/or other mechanical retention mechanisms. Such set of hubs and/or mechanical retention mechanisms for each disk stack may in turn be coupled to the other set, to provide mechanical stability, or the sets may be otherwise decoupled. It is further noted that while spindle motor 70A is shown to be on top of spindle motor 70B, they may be co-located at the bottom or the top.

FIG. 2C illustrates an example method 80 that motor controller 72 of disk drive 15 may perform or execute in controlling the operations of first spindle motor 70A and second spindle motor 70B. In step 82, motor controller 72 actuates first spindle motor 70A to rotate one or more of the disks 16 in the first disk stack 74A. In step 84, motor controller 72 actuates second spindle motor 70B to rotate one or more of the disks 16 in the second disk stack 74B. In step 86, the back electromotive force (BEMF) voltages generated by the first and second spindle motors 70A and 70B are detected. In step 88, the speeds of the first and second spindle motors 70A and 70B are controlled based on the detected BEMF voltages.

According to aspects of this disclosure, sensorless techniques may be implemented by one or more processing devices, such as motor controller 72, to monitor and drive rotation and speed of spindle motors 70A and 70B. Spindle motors 70A, 70B may comprise a plurality of windings and a rotor rotatable at a variable spin rate, and the rotor may generate a back electromotive force (BEMF) voltage across the windings that is proportional to the spin rate of the rotor. In a three-phase motor comprising three windings, for example, the BEMF voltage in each of the windings will be positioned 120 degrees out of phase with respect to the other windings. In various aspects, motor controller 72 is configured to detect the BEMF voltages of the spindle motor in order to determine the rotor positions of the spindle motors, without a position sensor, and to thereby derive, monitor and control the speed of the spindle motors. In one aspect of this disclosure, motor controller 72 comprises BEMF comparator detection circuitry that is configured to determine the rotor position of spindle motors 70A, 70B. By detecting zero crossings of the BEMF voltage during intervals when one of the spindle motors 70A, 70B is coasting, and determining the time between those zero crossings, the BEMF comparator detection circuitry can determine the rotor position. The speed of the spindle motor can be derived from changes in rotor position, and this information can be used for speed control.

In a motor controller for driving a three-phase spindle motor comprising three windings, for example, exemplary BEMF comparator detection circuitry may comprise three BEMF comparators (one for each phase A, B and C) implemented on one power large scale integrated circuit ("PLSI"). For a dual, three-phase spindle motor configuration, a second PLSI including three more BEMF comparators may be provided to drive the second motor. According to aspects of this disclosure, however, die space reduction and decreased power usage may be achieved by employing an alternative motor controller configuration. In particular, the comparator detection circuitry in a three BEMF comparator configuration on a single PLSI intended to drive a single motor may be modified to perform driving control for two spindle motors in a dual spindle motor configuration. According to aspects of this disclosure, a duplicative second PLSI with three additional comparators is not required to drive both spindle motors. Moreover, although aspects of this disclosure are described primarily with reference to a three-phase spindle motor configuration, those skilled in the art will appreciate that other numbers of phases may be used as well.

Figure 3:
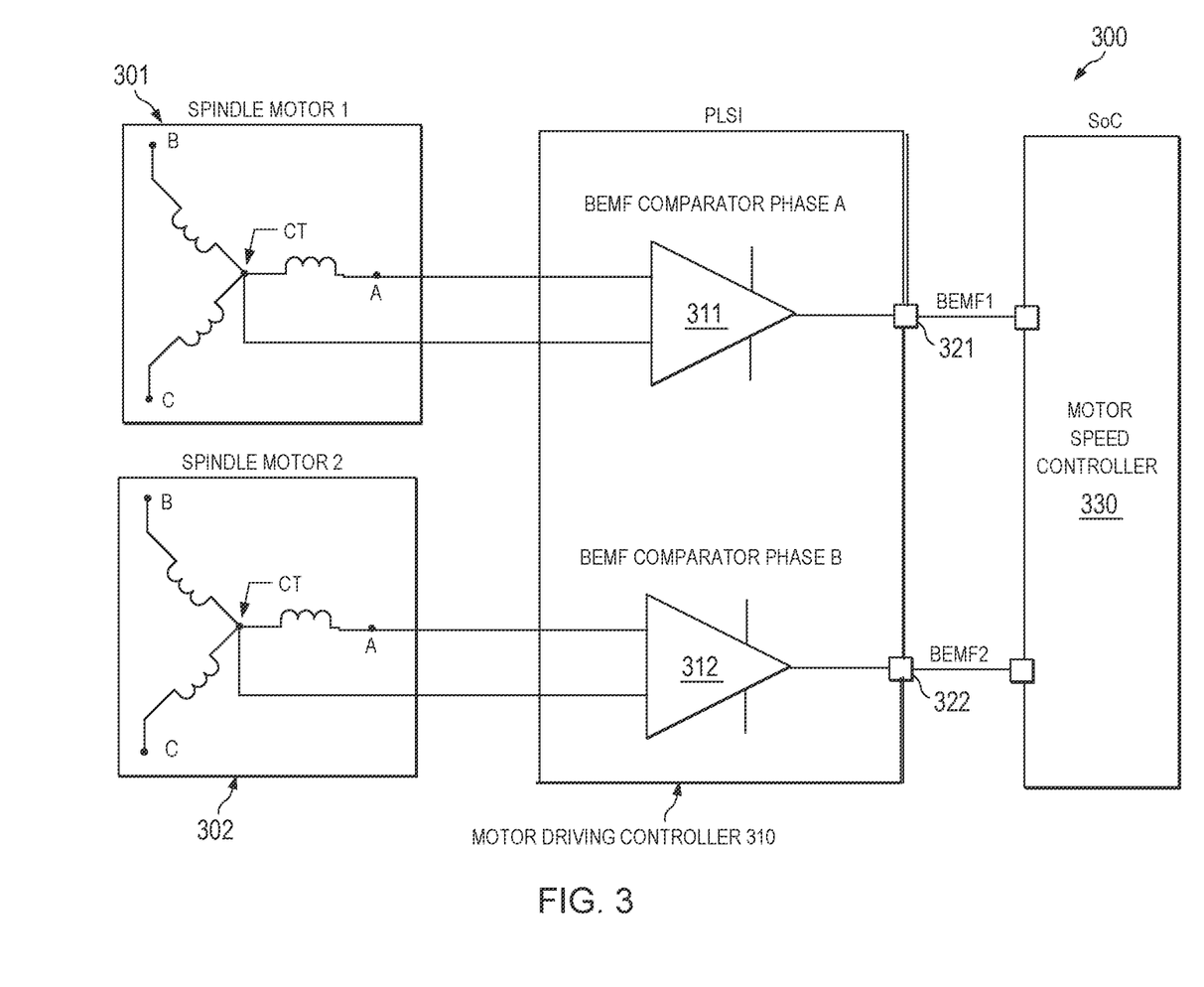
FIG. 3 illustrates a conceptual diagram of a dual spindle motor controller configuration for a first operating mode, in accordance with aspects of this disclosure.
Figure 4:
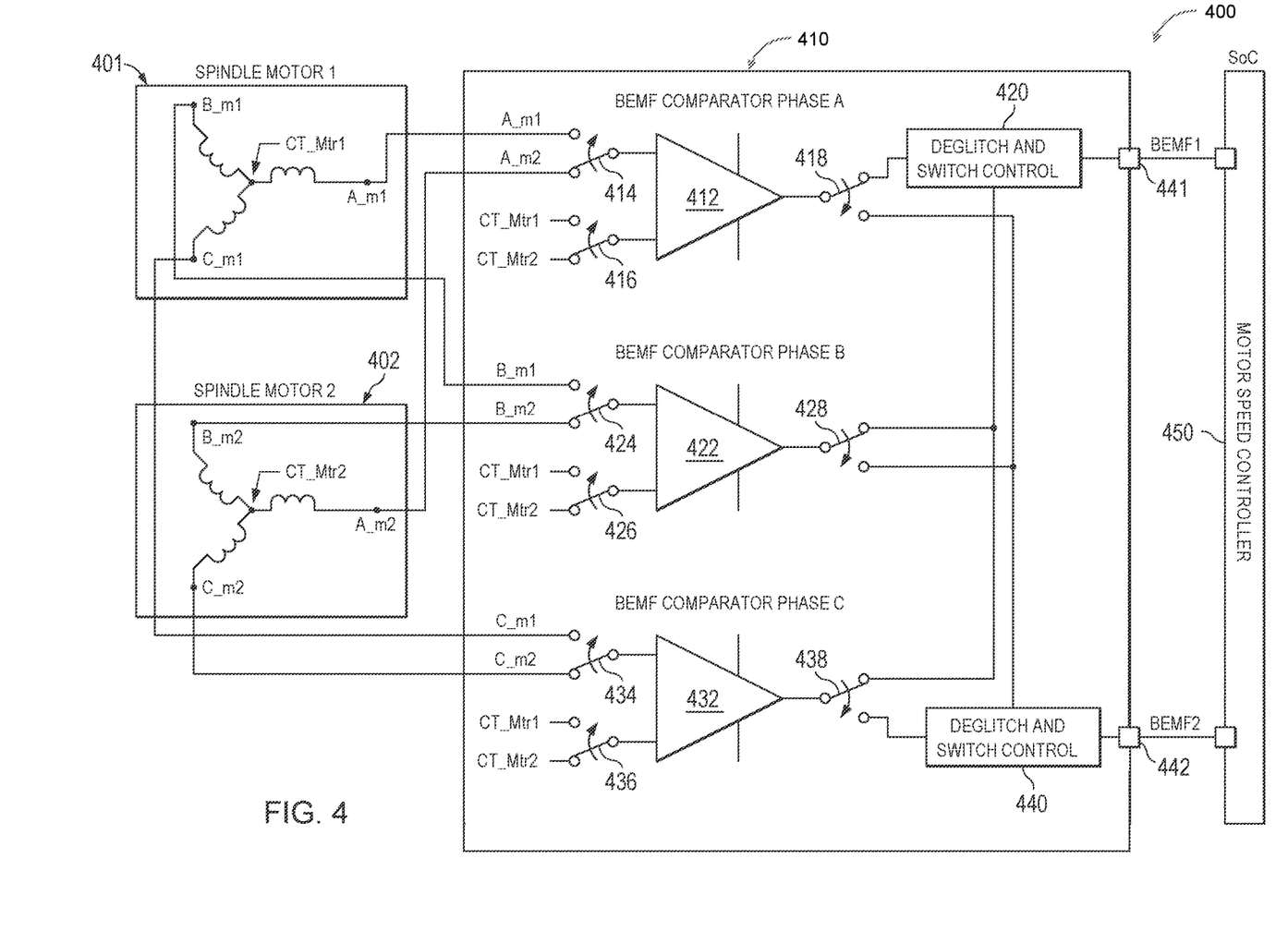
FIG. 4 illustrates a conceptual diagram of a dual spindle motor controller configuration for a second operating mode, in accordance with aspects of this disclosure.

Exemplary BEMF comparator detection circuitry of this disclosure is configured depending on whether it is being used in a first (1× or 6×) spindle motor operating mode (detecting 1 or 6 electrical crossings per mechanical revolution); or in a second (36×) spindle motor operating mode (detecting 36 electrical crossings in all 3 phases per mechanical revolution). FIGS. 3 and 4 respectively illustrate motor controller configurations for the first spindle motor operating mode (1× or 6×) and the second spindle motor operating mode (36×). Other examples in accordance with this disclosure may include other configurations consistent with the principles of this disclosure besides the first and second examples of FIGS. 3 and 4.

FIG. 3 illustrates a conceptual diagram of a dual spindle motor controller 300 configured to drive a first spindle motor 301 and a second spindle motor 302 in a first operating mode, in accordance with aspects of this disclosure. In particular, FIG. 3 depicts a dual motor controller 300 for driving spindle motors 301 and 302 in a 1× or 6× operating mode (detecting 1 or 6 electrical crossings per mechanical revolution). Spindle motors 301 and 302 may be configured, for example, in the same manner as first and second spindle motors 70A and 70B of FIG. 2B to drive rotation of independently operable disk stacks 74A and 74B. That is, first spindle motor 301 may be configured to rotate one or more of the disks 16 in the first stack of disks 74A, and second spindle motor 302 may be configured to rotate one or more of the disks 16 in the second stack of disks 74B. In various aspects, each of spindle motors 301, 302 has a three-phase winding topology and a BEMF voltage is generated in each of the windings that is positioned 120 degrees out of phase with respect to the BEMF voltage generated in the other windings.

According to aspects of this disclosure, motor controller 300 may comprise BEMF comparator detection circuitry 310 and motor speed controller 330. In one aspect, BEMF comparator detection circuitry 310 is configured on one PLSI and is configured to be coupled to both spindle motors 301 and 302, so as to detect the BEMF voltages generated by the spindle motors, as well as reference (center tap)

voltages of the spindle motors. BEMF comparator detection circuitry 310 comprises at least two BEMF comparators. In one aspect, BEMF comparator detection circuitry comprises a comparator for each of the three phases A, B and C of a three-phase spindle motor. In particular, BEMF comparator detection circuitry 310 may comprise phase A BEMF comparator 311; phase B BEMF comparator 312; and a phase C BEMF comparator (unused and not shown in the 1× or 6× operating mode of FIG. 3).

In a 1× or 6× operating mode, only one of the phase A, B or C BEMF voltages are needed. For example in one embodiment, only the phase A BEMF voltage across one winding of the spindle motor is needed. Thus, in this example for a single spindle motor configuration, the phase B and phase C BEMF comparators of the BEMF comparator detection circuitry on the PLSI are unneeded and would go unused. For a dual spindle motor configuration with each motor controller including dedicated comparator detection circuitry for each spindle motor implemented on separate and dedicated PLSIs, three more BEMF comparators would be provided on a second PLSI for the second spindle motor. Consequently, four BEMF comparators among the two PLSIs would go unneeded and unused (the phase B and phase C BEMF comparators on each PLSI). In accordance with aspects of this disclosure, comparator detection circuitry 310 implemented on one PLSI is configured to drive both spindle motors 301 and 302. Phase A BEMF comparator 311 is configured to detect the phase A BEMF voltage of first spindle motor 301. Phase B BEMF comparator 312, instead of being left unused, is repurposed and configured to detect the phase A BEMF voltage of second spindle motor 302.

As shown in FIG. 3, phase A BEMF comparator 311 is configured to have one input coupled to the phase A BEMF voltage of first spindle motor 301, and another input coupled to the reference voltage or center tap voltage (CT voltage) of first spindle motor 301. The output signal BEMF1 of comparator 311 is configured to be provided on a first BEMF output pin 321 of comparator detection circuitry 310, which is configured to be coupled and output to speed controller 330 of motor controller 300. Speed controller 330, in one aspect of this disclosure, is configured separately from BEMF detection circuitry 310. For example, speed controller 300 may be configured as a system on a chip (SoC). Phase B BEMF comparator 312 is configured to have one input coupled to the phase A BEMF voltage of second spindle motor 302, and another input coupled to the CT voltage of second spindle motor 302. The output signal BEMF2 of comparator 312 is configured to be provided on a second BEMF output pin 322 of comparator detection circuitry 310, which is configured to be coupled and output to speed controller 330.

FIG. 4 illustrates a conceptual diagram of a dual spindle motor controller 400 controlling a first spindle motor 401 and a second spindle motor 402 in a second operating mode, in accordance with aspects of this disclosure. In particular, FIG. 4 illustrates a motor controller 400 configured for a 36× operating mode (detecting 36 electrical crossings on all 3 phases per mechanical revolution). Spindle motors 401 and 402 may be configured, for example, in the same manner as first and second spindle motors 70A and 70B of FIG. 2B to drive rotation of independently operable disk stacks 74A and 74B. That is, first spindle motor 401 may be configured to rotate one or more of the disks 16 in the first stack of disks 74A, and second spindle motor 402 may be configured to rotate one or more of the disks 16 in the second stack of disks 74B. Each of spindle motors 401, 402 has a three-phase winding topology and a BEMF voltage is generated in each of the windings that is positioned 120 degrees out of phase with respect to the BEMF voltage generated in the other windings.

Spindle motor controller 400 comprises BEMF comparator detection circuitry 410 and speed controller 450. In one aspect, BEMF comparator detection circuitry 410 is configured on one PLSI and is configured to be switchably coupled to both spindle motors 401 and 402, so as to detect the BEMF voltages generated by the spindle motors, as well as to be switchably coupled to reference (center tap) voltages of both spindle motors 401 and 402. BEMF comparator detection circuitry 410 comprises a BEMF comparator for each of the three spindle motor phases A, B and C. Thus, comparator detection circuitry 410 comprises three comparators: phase A BEMF comparator 412; phase B BEMF comparator 422; and phase C BEMF comparator 432.

In 36× operating mode, the BEMF voltages across each of the windings A, B, C of spindle motors 401, 402 are detected. Thus, all three BEMF comparators 412, 422 and 432 are needed in even a single spindle motor configuration. According to aspects of this disclosure, switch and control circuitry is provided that enables selective switching of spindle motors 401, 402 to BEMF comparators 412, 422 and 432, such that spindle motors 401, 402 may share BEMF comparators 412, 422 and 432, in contrast to adding an additional PLSI with three additional comparators to detect and measure the BEMF voltage of the second spindle motor. Thus, in accordance with aspects of this disclosure, the three comparators of BEMF comparator detection circuitry 410 configured on one PLSI are configured to control both spindle motors 401, 402, even in a 36× spindle motor operating mode in which the BEMF voltages for all three phases A, B, C for each of the spindle motors are detected.

As shown in FIG. 4, phase A BEMF comparator 412 is provided with a phase A BEMF voltage input switch 414, and a reference or center tap (CT) input voltage switch 416. Input switch 414 is controlled to couple comparator 412 to the phase A BEMF voltage of first spindle motor 401 in a first (upper) position, and is controlled to couple comparator 412 to the phase A BEMF voltage of second spindle motor 402 in a second (lower) position. Likewise, input switch 416 is controlled to couple comparator 412 to the CT voltage of first spindle motor 401 in a first (upper) position, and is controlled to couple comparator 412 to the CT voltage of second spindle motor 402 in a second (lower) position. Thus, to detect the phase A BEMF voltage of first spindle motor 401, input switches 414 and 416 of comparator 412 are controlled to be in the first (upper) position, and to detect the phase A BEMF voltage of second spindle motor 402, input switches 414 and 416 are controlled to be in the second (lower) position.

Phase B BEMF comparator 422 and phase C BEMF comparator 432 are controlled with analogous switching configurations. Phase B comparator 422 is provided with a phase B BEMF voltage input switch 424, and a reference or center tap (CT) input voltage switch 426. Input switch 424 is controlled to couple comparator 422 to the phase B BEMF voltage of first spindle motor 401 in a first (upper) position, and is controlled to couple comparator 422 to the phase B BEMF voltage of second spindle motor 402 in a second (lower) position. Likewise, input switch 426 is controlled to couple comparator 422 to the CT voltage of first spindle motor 401 in a first (upper) position, and is controlled to couple comparator 422 to the CT voltage of second spindle motor 402 in a second (lower) position. Thus, to detect the phase B BEMF voltage of first spindle motor 401, input switches 424 and 426 of comparator 422 are controlled to be in the first (upper) position, and to detect the phase B BEMF voltage of second spindle motor 402, input switches 424 and 426 are controlled to be in the second (lower) position.

Phase C comparator 432 is provided with a phase C BEMF voltage input switch 434, and a center tap (CT) input voltage switch 436. Input switch 434 is controlled to couple comparator 432 to the phase C BEMF voltage of first spindle motor 401 in a first (upper) position, and is controlled to couple comparator 432 to the phase C BEMF voltage of second spindle motor 402 in a second (lower) position. Likewise, input switch 436 is controlled to couple comparator 432 to the CT voltage of first spindle motor 401 in a first (upper) position, and is controlled to couple comparator 432 to the CT voltage of second spindle motor 402 in a second (lower) position. Thus, to detect the phase C BEMF voltage of first spindle motor 401, input switches 434 and 436 of comparator 432 are controlled to be in the first (upper) position, and to detect the phase C BEMF voltage of second spindle motor 402, input switches 434 and 436 are controlled to be in the second (lower) position.

Output switches 418, 428 and 438 are provided at the respective outputs of comparators 412, 422 and 432 to appropriately route the detected BEMF voltages of spindle motors 401 and 402. When a BEMF voltage from first spindle motor 401 is being detected (whether phase A, B or C), each of output switches 418, 428 and 438 is controlled to be moved to a first (upper) position to route the detected BEMF voltage of first spindle motor 401 (BEMF1) to a first BEMF output pin 441 via deglitch and switch controller 420. When a BEMF voltage from second spindle motor 402 is being detected (whether phase A, B or C), each of output switches 418, 428 and 438 is controlled to be moved to a second (lower) position to route the detected BEMF voltage of second spindle motor 402 (BEMF2) to a second BEMF output pin 442 via deglitch and switch controller 440.

Deglitch and switch controllers 420 and 440 are provided at the outputs to control switching as well as to deal with switching transients. Controllers 420 and 440 smartly control which signal is being outputted to BEMF1 output pin 441 or to BEMF2 output pin 442. According to one aspect, only one signal at a time is outputted on either pin 441 or pin 442. For example, if switches 418, 428, 438 are in the up position such that the output signals of comparators 412, 422 and 432 are coupled to switch controller 420, switch controller 420 may look at only the signal from switch 418/comparator 412 and ignore the signals from switch 428/comparator 422 and switch 438/comparator 432, such that only the signal from switch 418/comparator 412 is outputted to BEMF1 pin 441. Next time it may look only at the signal from switch 428/comparator 422, followed in the next cycle by looking only at the signal from switch 438/comparator 432, and the cycle repeats. Likewise, if switches 418, 428, 438 are in the down position such that the output signals of comparators 412, 422 and 432 are coupled to switch controller 440, switch controller 440 may look at only the signal from switch 418/comparator 412 and ignore the signals from switch 428/comparator 422 and switch 438/comparator 432, such that only the signal from switch 418/comparator 412 is outputted to BEMF2 pin 442. Next time it may look only at the signal from switch 428/comparator 422, followed in the next cycle by looking only at the signal from switch 438/comparator 432, and the cycle repeats.

Figure 5:
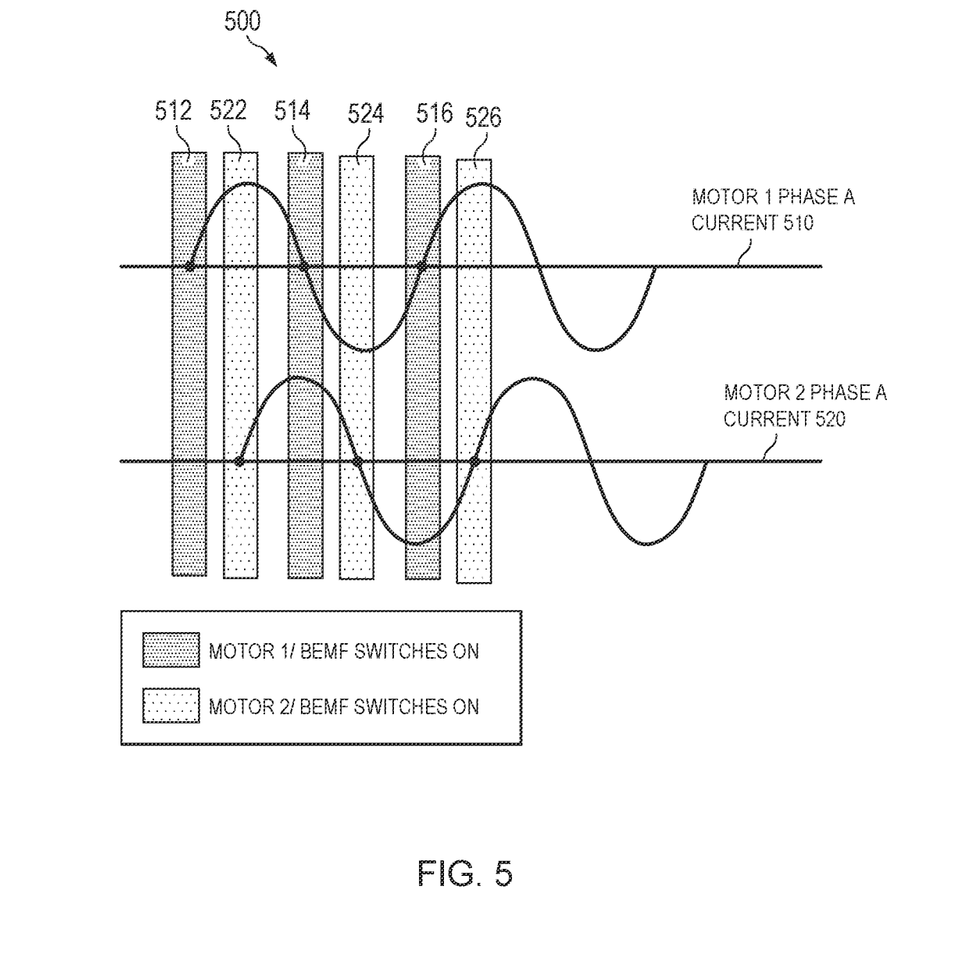
FIG. 5 is a diagram illustrating switch control and current waveforms for driving dual spindle motors in a manner to avoid overlap of windows for BEMF voltage detection, in accordance with aspects of this disclosure.

FIG. 5 is a diagram 500 illustrating switch control and current waveforms for driving spindle motors 401 and 402 in a manner to avoid overlap of windows for BEMF voltage detection, in accordance with aspects of this disclosure. In particular, diagram 500 illustrates current waveforms and switch control for the second (36×) operating mode for driving spindle motors 401 and 402 of FIG. 4. Waveform 510 is the phase A current for driving first spindle motor 401, and waveform 520 is the phase A current for driving second spindle motor 402. According to one aspect of this disclosure, current waveforms 510 and 520 are ninety degrees out of phase, such that spindle motors 401 and 402 are driven ninety degrees out of phase. By driving first and second spindle motors 401 and 402 ninety degrees out of phase, overlap of the windows for BEMF voltage detection can be avoided and the BEMF comparators 412, 422 and 432 can be properly shared. Spindle motors 401 and 402 are driven in a similar manner such that phases B and C are also ninety degrees out of phase.

To detect a BEMF voltage zero crossing for a particular phase of a particular motor, the switches of controller 400 must be enabled to allow detection of the BEMF voltage for that motor and phase at about the time that the zero crossing is expected to occur. As shown in FIG. 5, the switches are appropriately enabled for "windows" of time (512, 514, 516, 522, 524, 526) centered on a time that a zero crossing is expected to occur. Windows 512, 514 and 516 are configured for detecting zero crossings (depicted by dots) of the BEMF voltage of first spindle motor 401. During windows 512, 514 and 516, input switches 414 and 416 and output switch 418 of BEMF comparator 412 are controlled to be moved to the first (upper) position, such that the BEMF voltage zero crossing of phase A of first spindle motor 401 is detected. Similarly, windows 522, 524 and 526 are configured for detecting zero crossings of the BEMF voltage of second spindle motor 402. During windows 522, 524 and 526, input switches 414 and 416 and output switch 418 of BEMF comparator 412 are controlled to be moved to the second (lower) position, such that the BEMF zero crossing of phase A of second spindle motor 402 is detected. BEMF voltage zero crossings for the phase B and phase C BEMF voltages are also detected in this fashion. In this manner, overlap of the windows for BEMF voltage detection is avoided, and some peak power reduction advantages are provided.

In the first (1× or 6×) spindle motor operating mode of FIG. 3, by contrast, the dual spindle motors 301 and 302 may be driven 180 degrees out of phase in order to provide optimal peak power reduction.

Figure 6:
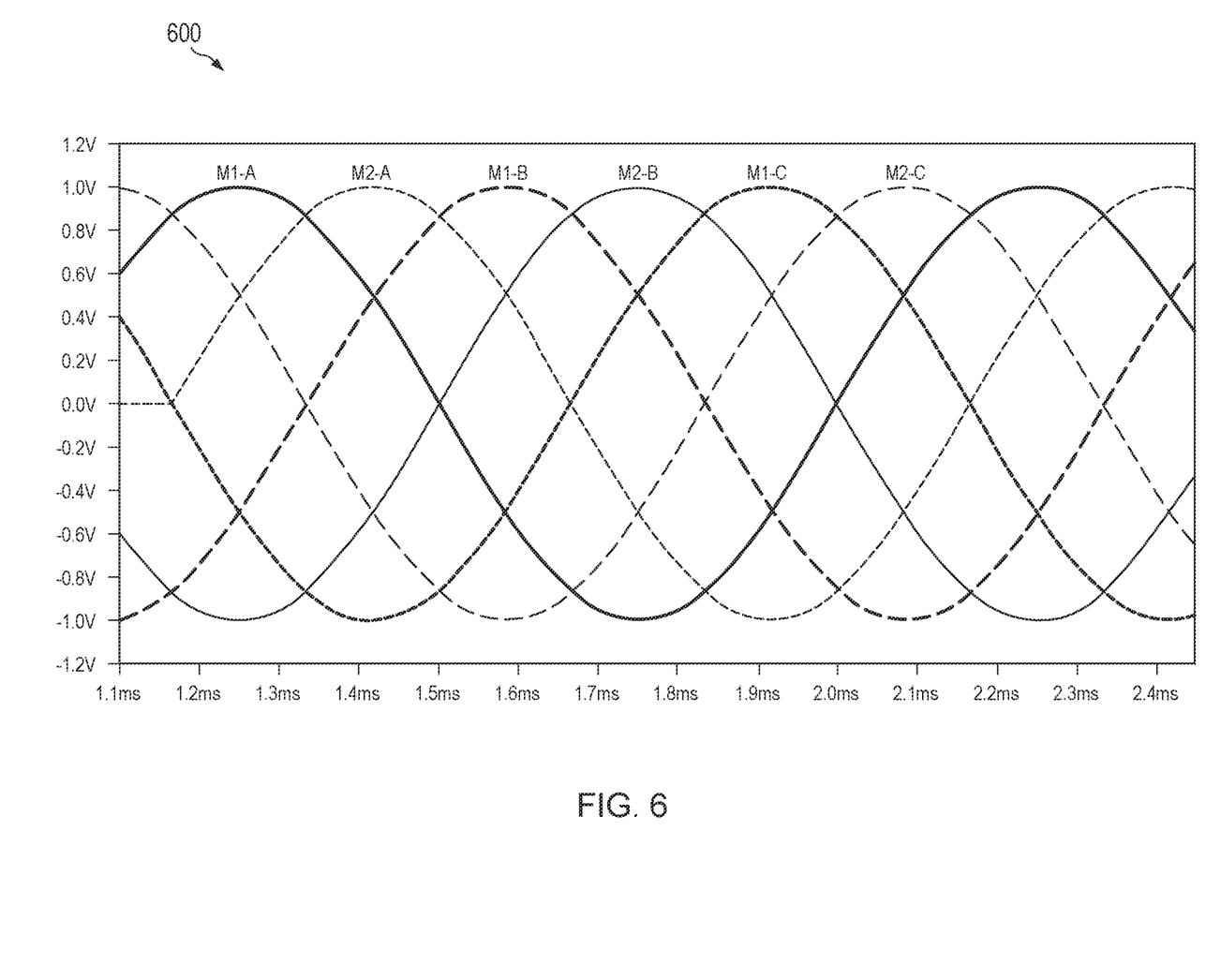
FIG. 6 illustrates a graph showing voltage waveforms for first motor phases A, B and C and second motor phases A, B and C, in accordance with aspects of this disclosure.

FIG. 6 illustrates a graph 600 showing voltage waveforms M1-A, M1-B and M1-C for respective phases A, B and C of first spindle motor 401, and the voltage waveforms M2-A, M2-B and M2-C for respective phases A, B and C of second spindle motor 402, in accordance with aspects of this disclosure. As can be seen in FIG. 6, waveforms M1-A, M1-B and M1-C for first spindle motor 401 are separated by the usual 120 degrees apart for a three-phase spindle motor. Waveforms M2-A, M2-B and M2-C for second spindle motor 402 are 180 degrees apart from the first spindle motor voltage waveforms M1-A, M1-B and M1-C. As can be seen in FIG. 6, this spreads out the peaks to be flatter and to advantageously provide improved peak power reduction.

Figure 7:
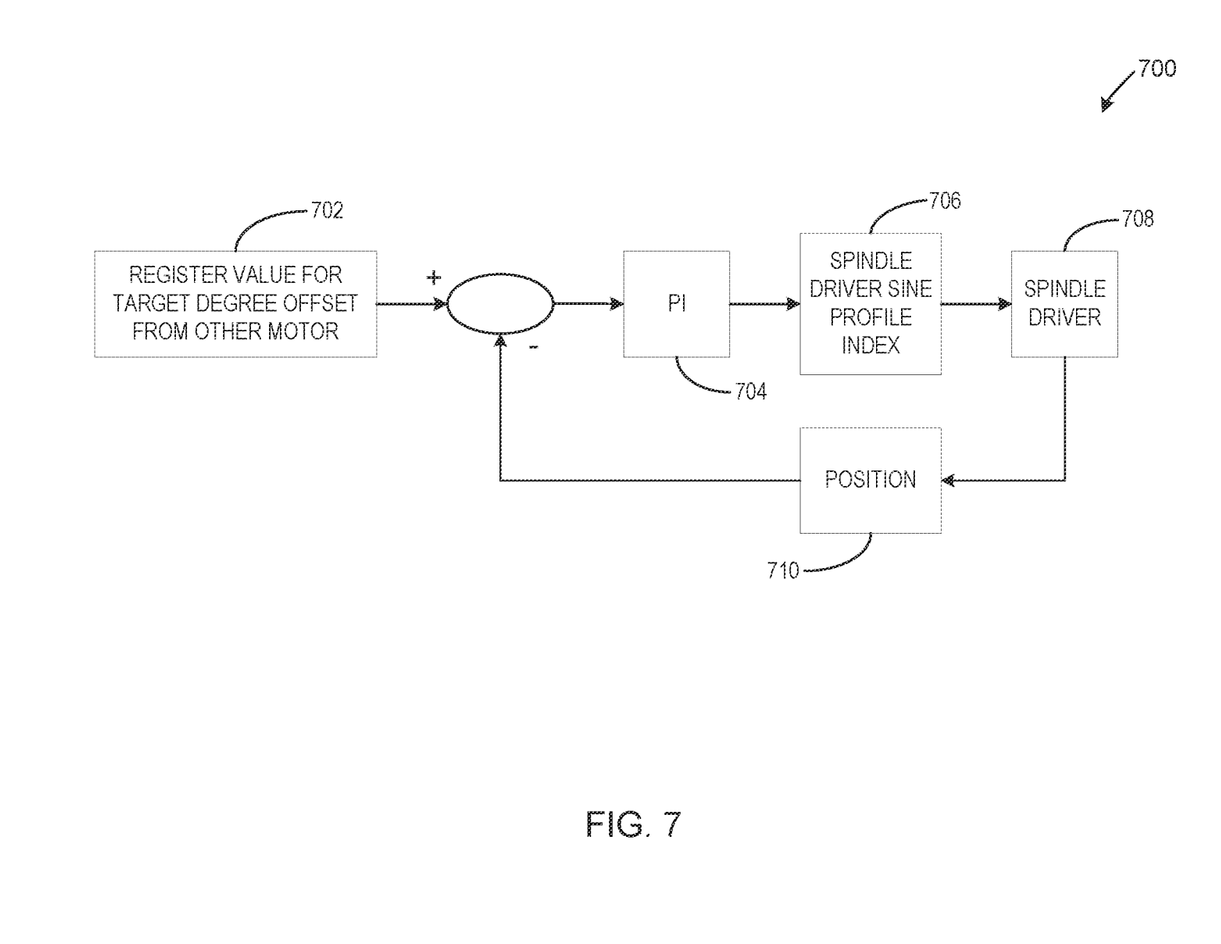
FIG. 7 illustrates a conceptual block diagram of a control method for adjusting sine wave profile indexes of current waveforms for driving the spindle motors to reach a target degree of offset from each other, in accordance with aspects of this disclosure.

FIG. 7 illustrates a conceptual block diagram of a control method 700 that may be implemented by motor controllers 300 and 400 for adjusting the sine wave profile indexes of the current waveforms for driving the spindle motors to reach a target degree of offset from each other, in accordance with aspects of this disclosure. As described with reference to FIG. 5, for example, driving the spindle motors with current waveforms that are ninety degrees offset from each other is advantageous in that overlap of the windows for detection of BEMF voltage zero crossings can be avoided.

In order to maintain a degree of offset between the sine wave profiles of the drive current waveforms for the two spindle motors that is equal or nearly equal to a target degree of offset (e.g., 180 degrees of offset in the first 1×/6× operating mode; 90 degrees of offset in the 36× operating mode), the current position of the sine wave profile of one of the spindle motors (block 710), as obtained from the spindle driver (block 708), is iteratively compared in a feedback loop with the registered value for a target degree of offset from the other of the spindle motors (block 702). A proportional-integral (PI) controller (block 704) is used to make any needed adjustments to the sine wave profile index (block 706) of the current waveform(s) to reach the target degree of offset between the two current profiles. In one aspect, the degree of offset may be adjusted by changing the sine wave profile index of one spindle motor such that its sine wave profile is 90 degrees (in the case of 36× driving mode) or 180 degrees (in the case of 1× or 6× driving mode) offset from the sine wave profile of the other spindle motor.

Figure 8:
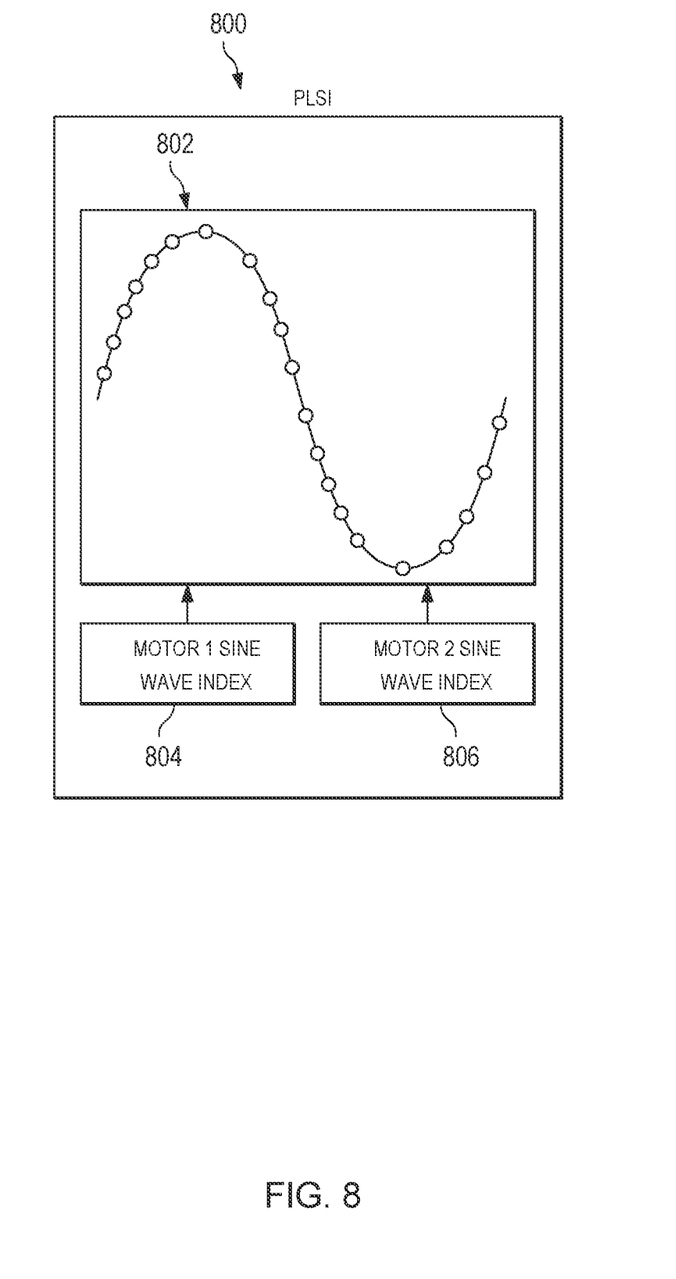
FIG. 8 illustrates a conceptual block diagram of a sine wave lookup table, in accordance with aspects of this disclosure.

FIG. 8 illustrates a simplified conceptual diagram 800 of a sine wave lookup table 802 that may be implemented by motor controllers 300 and 400, in accordance with illustrative aspects of this disclosure. In one aspect, sine wave lookup table 802 may be configured on the PLSI with the BEMF comparator detection circuitry. As explained with reference to FIG. 7, sine wave lookup table 802 is used to create the sine wave current profiles for the spindle motors, and the degree of offset between the sine wave profiles for the spindle motors can be adjusted by changing the profile index for one or both of the spindle motors. With reference to FIG. 8, it should be noted that the sample size (resolution) shown on sine wave lookup table 802 has been simplified (reduced) for ease of illustration. Typically, the sample size would be a much higher value such as, in one example, 756 samples.

In one example, sine wave lookup table 802 may be shared by the two spindle motors, with separate indexes being provided for each spindle motor. As shown in FIG. 8, first index 804 is provided to index the sine wave current profile for driving the first spindle motor to sine wave lookup table 802, and second index 806 is provided to index the sine wave current profile for driving the second spindle motor to sine wave lookup table 802. The sharing of the sine wave lookup table by the two motors advantageously saves significant die space that would otherwise be occupied by separate sine wave lookup tables for each spindle motor.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for dual spindle motors, and dual spindle motor control, and other aspects of this disclosure. Persons skilled in the relevant fields of art will be well-equipped by this disclosure with an understanding and an informed reduction to practice of a wide panoply of further applications, architectures, techniques, and methods for dual spindle motors, and dual spindle motor control, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
a first spindle motor configured to rotate one or more disks in a first stack of disks;
a second spindle motor configured to rotate one or more disks in a second stack of disks; and
one or more processing devices comprising a motor controller, wherein
the motor controller has back electromotive force (BEMF) comparator detection circuitry configured to detect BEMF voltages generated by the first spindle motor and the second spindle motor, and
the motor controller is configured to control speeds of the first spindle motor and the second spindle motor based on the detected BEMF voltages, wherein
the BEMF comparator detection circuitry comprises a first BEMF comparator and a second BEMF comparator;
the first BEMF comparator is configured to be coupled to one phase of the BEMF voltages of the first spindle motor; and
the second BEMF comparator is configured to be coupled to the same one phase of the BEMF voltages of the second spindle motor.

2. The data storage device of claim 1, wherein:
the BEMF comparator detection circuitry is configured on one power large scale integrated circuit (PLSI) to detect the BEMF voltages generated by both the first spindle motor and the second spindle motor.

3. The data storage device of claim 2, wherein:
the first BEMF comparator is configured to be coupled to a center tap voltage of the first spindle motor; and
the second BEMF comparator is configured to be coupled to a center tap voltage of the second spindle motor.

4. The data storage device of claim 3, wherein:
the motor controller further comprises a motor speed controller;
the first BEMF comparator is configured to output a phase A BEMF voltage of the first spindle motor on a first BEMF output of the PLSI that is configured to be coupled to the motor speed controller; and
the second BEMF comparator is configured to output a phase A BEMF voltage of the second spindle motor on a second BEMF output of the PLSI that is configured to be coupled to the motor speed controller.

5. The data storage device of claim 4, wherein the motor speed controller is configured on a system on a chip (SoC).

6. A data storage device comprising:
a first spindle motor configured to rotate one or more disks in a first stack of disks;
a second spindle motor configured to rotate one or more disks in a second stack of disks; and
one or more processing devices comprising a motor controller, wherein:
the motor controller has back electromotive force (BEMF) comparator detection circuitry configured to detect BEMF voltages generated by the first spindle motor and the second spindle motor, and
the motor controller is configured to control speeds of the first spindle motor and the second spindle motor based on the detected BEMF voltages, wherein:
the BEMF comparator detection circuitry comprises a first BEMF comparator, a second BEMF comparator and a third BEMF comparator;

the first BEMF comparator is configured to be switchably coupled to a phase A BEMF voltage of the first spindle motor or to a phase A BEMF voltage of the second spindle motor;
the second BEMF comparator is configured to be switchably coupled to a phase B BEMF voltage of the first spindle motor or to a phase B BEMF voltage of the second spindle motor; and
the third BEMF comparator is configured to be switchably coupled to a phase C BEMF voltage of the first spindle motor or to a phase C BEMF voltage of the second spindle motor.

7. The data storage device of claim 6, wherein:
the first BEMF comparator is configured to be switchably coupled to a center tap voltage of the first spindle motor or to a center tap voltage of the second spindle motor;
the second BEMF comparator is configured to be switchably coupled to the center tap voltage of the first spindle motor or to the center tap voltage of the second spindle motor; and
the third BEMF comparator is configured to be switchably coupled to the center tap voltage of the first spindle motor or to the center tap voltage of the second spindle motor.

8. The data storage device of claim 7, wherein:
the motor controller further comprises a motor speed controller;
the first BEMF comparator is configured to be switchably coupled to a first BEMF output that is configured to output the phase A BEMF voltage of the first spindle motor to the motor speed controller, or to a second BEMF output that is configured to output the phase A BEMF voltage of the second spindle motor to the motor speed controller;
the second BEMF comparator is configured to be switchably coupled to the first BEMF output to output the phase B BMF voltage of the first spindle motor to the motor speed controller, or to the second BEMF output to output the phase B BMF voltage of the second spindle motor to the motor speed controller; and
the third BEMF comparator is configured to be switchably coupled to the first BEMF output to output the phase C BMF voltage of the first spindle motor to the motor speed controller, or to the second BEMF output to output the phase C BMF voltage of the second spindle motor to the motor speed controller.

9. A data storage device comprising:
a first spindle motor configured to rotate one or more disks in a first stack of disks;
a second spindle motor configured to rotate one or more disks in a second stack of disks; and
one or more processing devices comprising a motor controller, wherein:
the motor controller has back electromotive force (BEMF) comparator detection circuitry configured to detect BEMF voltages generated by the first spindle motor and the second spindle motor, and
the motor controller is configured to control speeds of the first spindle motor and the second spindle motor based on the detected BEMF voltages, wherein:
the motor controller further comprises a sine wave lookup table configured to create sine wave current profiles for driving the first spindle motor and the second spindle motor;
the sine wave lookup table is configured to be shared by the first spindle motor and the second spindle motor; and the sine wave lookup table comprises a first index configured to index the sine wave current profile for driving the first spindle motor to the sine wave lookup table, and a second index configured to index the sine wave current profile for driving the second spindle motor to the sine wave lookup table.

10. The data storage device of claim 9, wherein the the BEMF comparator detection circuitry and the sine wave look up table are configured on one power large scale integrated circuit (PLSI).

11. A method comprising:
rotating, by a first spindle motor, one or more disks in a first stack of disks;
rotating, by a second spindle motor, one or more disks in a second stack of disks;
detecting, by one or more processing devices comprising a motor controller having back electromotive force (BEMF) comparator detection circuitry, BEMF voltages generated by the first spindle motor and by the second spindle motor;
controlling, by the one or more processing devices, speeds of the first spindle motor and the second spindle motor based on the detected BEMF voltages;
coupling a first BEMF comparator of the BEMF comparator detection circuitry to a phase A BEMF voltage of the first spindle motor; and
coupling a second BEMF comparator of the BEMF comparator detection circuitry to a phase A BEMF voltage of the second spindle motor.

12. The method of claim 11, further comprising:
providing, in the motor controller, the BEMF comparator detection circuitry on one power large scale integrated circuit (PLSI) to detect the BEMF voltages generated by both the first spindle motor and the second spindle motor.

13. The method of claim 12, further comprising:
outputting, by the first BEMF comparator, the phase A BEMF voltage of the first spindle motor to a motor speed controller; and
outputting, by the second BEMF comparator, the phase A BEMF voltage of the second spindle motor to the motor speed controller.

14. A method comprising:
rotating, by a first spindle motor, one or more disks in a first stack of disks;
rotating, by a second spindle motor, one or more disks in a second stack of disks;
detecting, by one or more processing devices comprising a motor controller having back electromotive force (BEMF) comparator detection circuitry, BEMF voltages generated by the first spindle motor and by the second spindle motor;
controlling, by the one or more processing devices, speeds of the first spindle motor and the second spindle motor based on the detected BEMF voltages;
switchably coupling a first BEMF comparator of the BEMF comparator detection circuitry to a phase A BEMF voltage of the first spindle motor or to a phase A BEMF voltage of the second spindle motor;
switchably coupling a second BEMF comparator of the BEMF comparator detection circuitry to a phase B BEMF voltage of the first spindle motor or to a phase B BEMF voltage of the second spindle motor; and
switchably coupling a third BEMF comparator of the BEMF comparator detection circuitry to a phase C BEMF voltage of the first spindle motor or to a phase C BEMF voltage of the second spindle motor.

15. The method of claim 14, further comprising:
switchably coupling the first BEMF comparator to a first BEMF output to output the phase A BEMF voltage of the first spindle motor to a motor speed controller, or to a second BEMF output to output the phase A BEMF voltage of the second spindle motor to the motor speed controller;
switchably coupling the second BEMF comparator to the first BEMF output to output the phase B BEMF voltage of the first spindle motor to the motor speed controller, or to the second BEMF output to output the phase B BEMF voltage of the second spindle motor to the motor speed controller;
switchably coupling the third BEMF comparator to the first BEMF output to output the phase C BEMF voltage of the first spindle motor to the motor speed controller, or to the second BEMF output to output the phase C BEMF voltage of the second spindle motor to the motor speed controller.

16. A method comprising:
rotating, by a first spindle motor, one or more disks in a first stack of disks;
rotating, by a second spindle motor, one or more disks in a second stack of disks;
detecting, by one or more processing devices comprising a motor controller having back electromotive force (BEMF) comparator detection circuitry, BEMF voltages generated by the first spindle motor and by the second spindle motor;
controlling, by the one or more processing devices, speeds of the first spindle motor and the second spindle motor based on the detected BEMF voltages;
providing, in the motor controller, a sine wave lookup table comprising sine wave current profiles for driving the first spindle motor and the second spindle motor;
indexing the sine wave current profile for driving the first spindle motor to the sine wave lookup table with a first index; and
indexing the sine wave current profile for driving the second spindle motor to the sine wave lookup table with a second index.

\* \* \* \* \*